(12) United States Patent
Sundet et al.

(10) Patent No.: US 7,448,275 B1
(45) Date of Patent: Nov. 11, 2008

(54) BI-PLANAR PROCESS FLUID PRESSURE MEASUREMENT SYSTEM

(75) Inventors: Paul C. Sundet, Savage, MN (US); Daniel A. Norberg, New Brighton, MN (US); Andrew A. Dille, Bloomington, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/900,439

(22) Filed: Sep. 12, 2007

(51) Int. Cl.
    *G01L 7/00* (2006.01)
(52) U.S. Cl. ...................................... 73/706
(58) Field of Classification Search .................. 73/706, 73/756
    See application file for complete search history.

(56) References Cited

U.S. PATENT DOCUMENTS

| | | | |
|---|---|---|---|
| 4,230,187 A | 10/1980 | Seto et al. | 166/336 |
| 4,466,290 A | 8/1984 | Frick | 73/756 |
| 4,745,810 A | 5/1988 | Pierce et al. | 73/706 |
| 4,798,089 A | 1/1989 | Frick et al. | 73/706 |
| 4,833,922 A | 5/1989 | Frick et al. | 73/756 |
| 4,993,754 A | 2/1991 | Templin, Jr. | 285/189 |
| 5,524,492 A | 6/1996 | Frick et al. | 73/706 |
| 6,038,927 A * | 3/2000 | Karas | 73/706 |
| 6,059,254 A | 5/2000 | Sundet et al. | 248/678 |
| 6,079,276 A | 6/2000 | Frick et al. | 73/718 |
| 6,272,931 B1 | 8/2001 | Nimberger | 73/756 |
| 6,279,401 B1 * | 8/2001 | Karas | 73/716 |
| 6,389,904 B1 | 5/2002 | Petrich et al. | 73/756 |
| 6,473,711 B1 | 10/2002 | Sittler et al. | 702/138 |
| 6,487,912 B1 | 12/2002 | Behm et al. | 73/753 |
| 6,568,278 B2 | 5/2003 | Nelson et al. | 73/756 |
| 6,918,303 B2 * | 7/2005 | Casimiro et al. | 73/706 |
| 2002/0178827 A1 | 12/2002 | Wang | 73/718 |
| 2005/0034523 A1 * | 2/2005 | Casimiro et al. | 73/715 |

FOREIGN PATENT DOCUMENTS

| | | |
|---|---|---|
| WO | WO 95/08759 | 3/1995 |
| WO | WO 98/30880 | 7/1998 |
| WO | WO 03/008921 | 7/2001 |

OTHER PUBLICATIONS

Fisher-Rosemount Comprehensive Product Catalog 00805-0100-0125, Jan. 1998, Pressure pp. 131-140 entitled "Absolute and Gage Pressure Transmitters".

* cited by examiner

*Primary Examiner*—Andre J Allen
(74) *Attorney, Agent, or Firm*—Christopher R. Christenson; Westman, Champlin & Kelly, P.A.

(57) ABSTRACT

A pressure measurement system includes a co-planar pressure sensor module coupled to a bi-planar pressure flange. The co-planar pressure sensor module has a pair of isolator diaphragms that are substantially co-planar with one another. A plurality of connection rings are welded proximate and about respective isolator diaphragms. A bi-planar pressure flange is welded to each of the connection rings. Fluidic coupling from a process fluid pressure inlet of the bi-planar flange to an isolator diaphragm of the co-planar pressure module occurs without encountering any compressive seals. A method of manufacturing a pressure measurement system is also provided.

20 Claims, 10 Drawing Sheets

BI-PLANAR PROCESS FLUID PRESSURE MEASUREMENT SYSTEM

BACKGROUND

Bi-planar process pressure flanges couple process fluids in process installations to process variable transmitters, typically process fluid pressure measurement transmitters. Bi-planar process fluid pressure measurement systems are well known in the art and provide a number of advantages over other configurations. Relatively recently, Rosemount Inc., the Assignee of the current application, developed a standardized co-planar pressure sensor module. The pressure sensor module is co-planar in the sense that it presents two process fluid isolator diaphragms that are substantially in the same plane. Rosemount has also developed bi-planar pressure flanges sold under the trade designation Model 305® which are configured to route process fluids to the co-planar pressure sensor module.

As process applications continue to push for higher and higher operating ranges and present more demanding operating conditions, there is a desire to provide pressure transmitters that are capable of providing longer operating lifetimes at more demanding operating conditions. As such demanding operating conditions reach the design limits of modern process fluid pressure transmitters, there are a number of important considerations. First, undue measurement errors can be introduced by the physical deformation of the materials of the process fluid transmitter. Second, leaks can form. And finally, catastrophic failure can occur when physical forces simply overwhelm individual joints or interfaces.

Providing a bi-planar flange assembly that could allow a co-planar process pressure sensor module to operate at higher temperatures, pressures, and/or radiation levels for longer lifetimes would represent a significant benefit to the process measurement and control industry. In particular, measurement and control of process pressures within nuclear power plants would be greatly enhanced.

SUMMARY

A pressure measurement system includes a co-planar pressure sensor module coupled to a bi-planar pressure flange. The co-planar pressure sensor module has a pair of isolator diaphragms that are substantially co-planar with one another. A plurality of connection rings are welded proximate and about respective isolator diaphragms. A bi-planar pressure flange is welded to each of the connection rings. Fluidic coupling from a process fluid pressure inlet of the bi-planar flange to an isolator diaphragm of the co-planar pressure module occurs without encountering any compressive seals. A method of manufacturing a pressure measurement system is also provided.

DETAILED DESCRIPTION

Figure 1A:
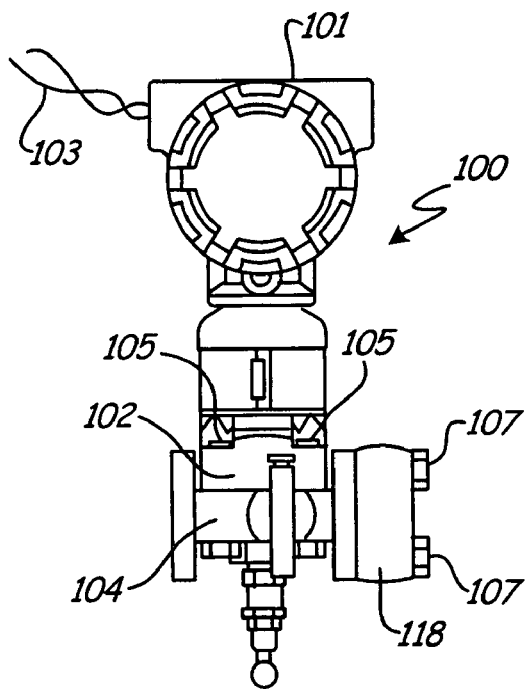
FIGS. 1A and 1B illustrate front and side views, respectively, of an exemplary prior art pressure transmitter.
Figure 1B:
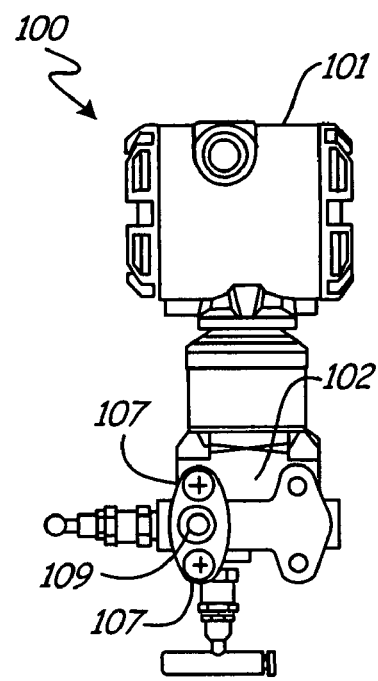

FIGS. 1A and 1B illustrate front and side views of exemplary prior art pressure transmitter 100. Pressure transmitter 100 includes electronics housing 101 that encloses electronic circuitry and a module housing 102 that houses isolator diaphragms, a pressure sensor and associated sensor circuitry. Module housing 102 is bolted to pressure flange 104 by bolts 105. Additionally, a flange adapter union 118 can be bolted to pressure flange using bolts 107. Flange adapter union 118 has a threaded inlet 109 that is connectable to threaded process pipes (not illustrated). Pressure flange 104 provides one or more process fluid pressures to transmitter 100 for pressure measurement. Pressure transmitter 100 is connected to a process loop 103 that energizes pressure transmitter 100 and can provide bi-directional communication for use in a process control system.

Figure 2:
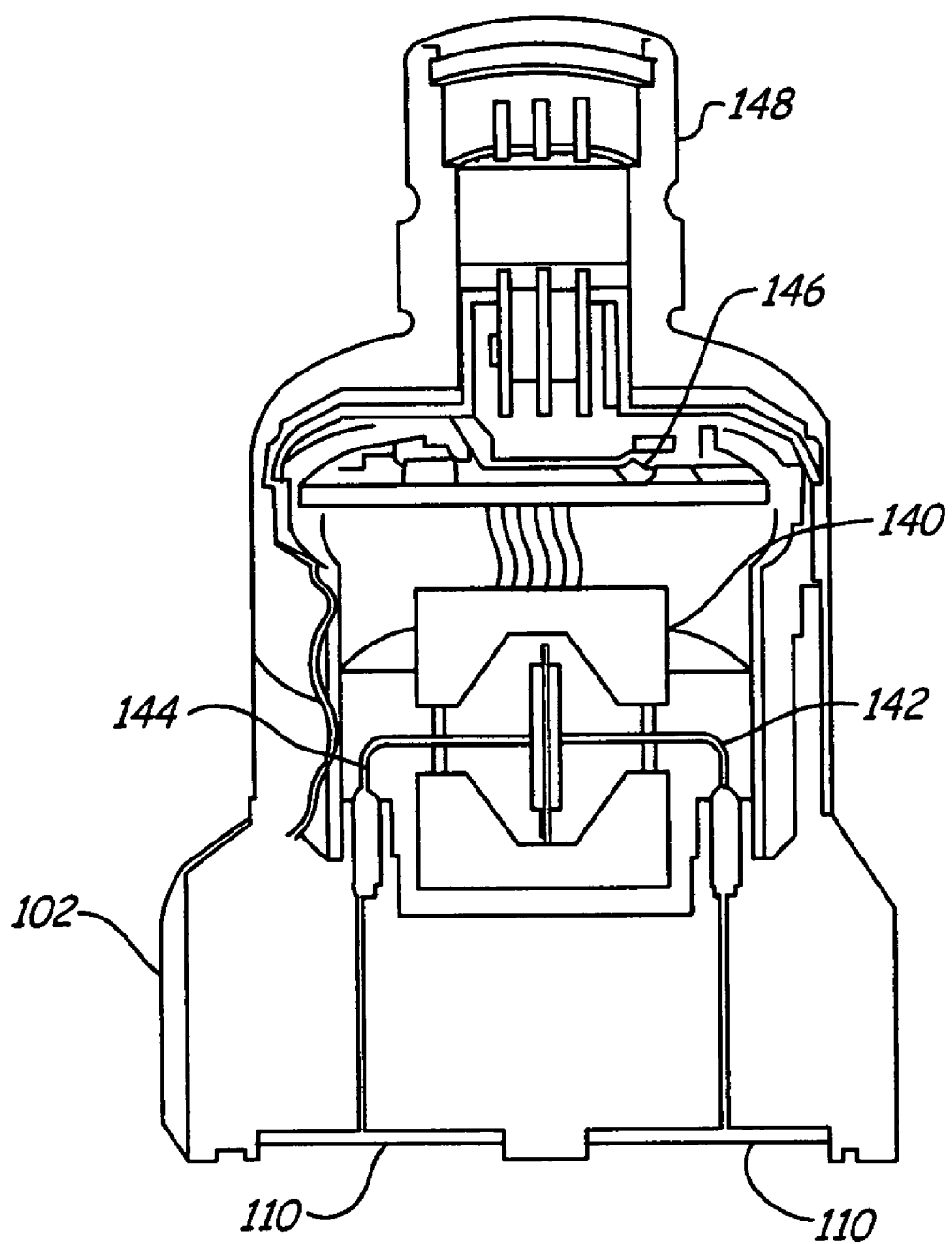
FIG. 2 is a cross sectional view of a co-planar pressure sensor module housing with which embodiments of the present invention are particularly useful.

FIG. 2 illustrates a cross sectional view of a module housing 102. Pressure sensor 140 is located inside module housing 102 and connects, by tubes 142, 144 to isolator diaphragms 110. Isolator diaphragms 110 are welded directly to module housing 102. Circuit board 146 provides circuitry associated with processing electrical signals from sensor 140. Connector 148 provides electrical connections from the circuit board 146 to circuitry in an electronics housing (such as housing 101 shown in FIGS. 1A and 1B). Sensor housing 102 is considered a co-planar pressure sensor module in that isolator diaphragms 110 are substantially co-planar with one another. In the past, compression-type seals, such as o-rings and gaskets were used to generate seals between pressure flange 104 and module 102. The force exerted upon such seals to compress them and generate the sealing effects were provided by bolts 105 bearing into internally threaded apertures within pressure sensor module 102.

Pressure sensor module 102 is generally indicative of a relatively new standard in pressure sensing. In particular, pressure sensor module 102 is illustrative of a co-planar pressure sensor module sold under the trade designation Model 3051S available from Rosemount Inc., of Chanhassen, Minn. This sensor module is highly adaptable and can be used in a variety of applications due to its adaptability and modularity. However, embodiments of the present invention are practicable with any suitable co-planar pressure sensor module.

In accordance with one embodiment of the present invention, a plurality of welds, preferably fusion welds, are used to mechanically couple and hermetically seal the bi-planar pressure flange to the co-planar pressure sensor module. Embodiments of the present invention generally employ a plurality of connector rings and a plurality of welding caps to facilitate the provision of high-strength fusion welds within the complex geometries of the pressure sensor module and bi-planar pressure flange.

Figure 3:
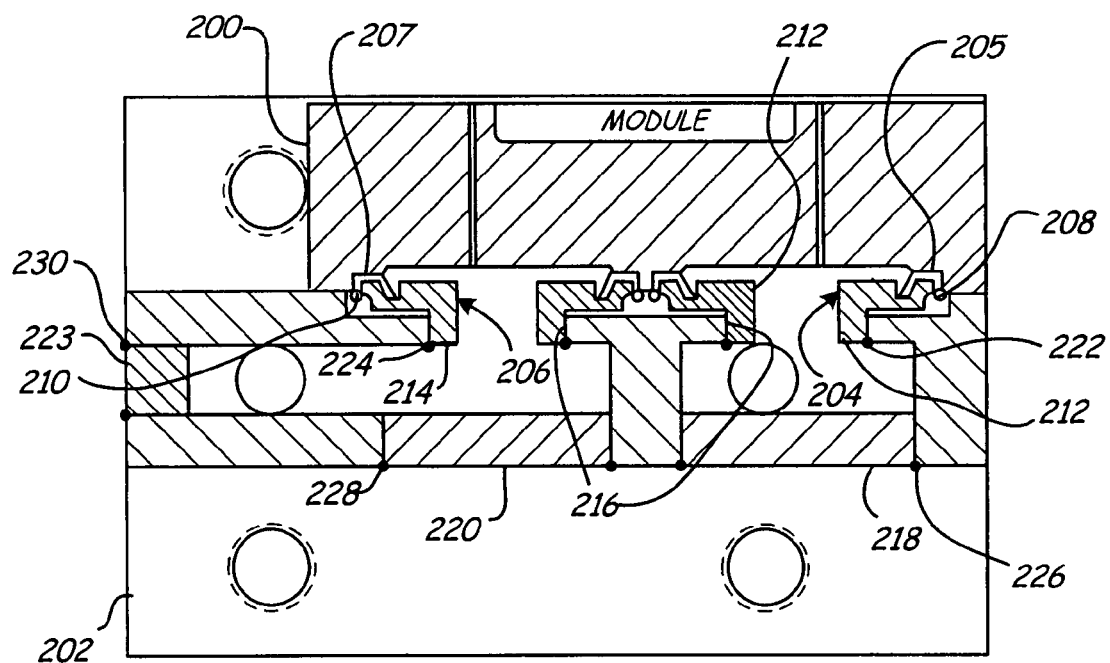
FIG. 3 is a cross-sectional view of a co-planar pressure sensor module coupled to a bi-planar pressure flange in accordance with an embodiment of the present invention.

FIG. 3 is a cross-sectional cut-away view of a portion of a bi-planar pressure flange and co-planar pressure sensor module coupled to one another in accordance with an embodiment of the present invention. FIG. 3 depicts pressure sensor module 200 coupled to bi-planar pressure flange 202. The weld rings 205, 207 secure the isolator diaphragms to the sensor module. Pressure sensor module 200 may be the same as pressure sensor module 102 (described above with respect to FIG. 2), or may be any suitable co-planar pressure sensor module. FIG. 3 illustrates a pair of connection rings 204, 206 fusion-welded to weld rings 205, 207, respectively. These welds are depicted at reference numerals 208 and 210, respectively. Each weld 208, 210 mechanically and hermetically bonds its respective connection ring 204, 206 to a weld ring of pressure sensor module 200 in such a way that also seals the connection ring to the pressure sensor module. Any suitable type of fusion weld can be used. Preferably, the fusion weld is a Tungsten-Inert-Gas (TIG) weld. Welds 208 and 210 are provided before pressure flange 202 is in place. Accordingly, access to the locations where welds 208 and 210 will be placed is straightforward. Each of connection rings 204, 206 includes a down-turned lip 212, 214 that has an outer diameter which is sized to fit precisely within the inner diameters 216 of pressure flange 202. As pressure flange 202 is brought into contact with pressure sensor module 200, inner diameters 216 pass over down-turned lips 212 and 214. This creates the surface for the second set of fusion welds. In order to provide access for such fusion welds, weld caps 218, 220 are not in place and thus the respective apertures for the weld caps provide access for the welding equipment that generates the second set of fusion welds. Again, the fusion welds are preferably TIG welds bonding each down-turned lip 212, 214 to its respective inner diameter 216 of pressure flange 202. With the completion of the second set of fusion bonds, pressure flange 202 is now hermetically bonded, using fusion welds, to pressure sensor module 200. Next, weld caps 218 and 220 are placed into their respective apertures. Preferably, pressure flange 202 includes a slight shoulder machined, or otherwise formed, therein to maintain weld caps 218 and 220 at their correct axial locations. Accordingly, when the assembly illustrated in FIG. 3 is tipped upside-down, weld caps 218 and 220 simply rest in their respective apertures to facilitate welding. A third set of fusion welds is provided along the outer periphery of each of weld caps 218 and 220 thereby bonding the respective weld cap to the inner diameter of its respective aperture. Finally, plug 223 is placed within pressure flange 202 and hermetically bonded therein using fusion bonds.

The resultant pressure measurement assembly is a combination of a co-planar pressure sensor module and a bi-planar pressure flange that are sealed together and mechanically fixed together completely using fusion welds. Accordingly, there are no compressive sealing surfaces such as gaskets or o-rings. Further still, the design and placement of the welded components provides a robust response to the high pressures occurring within the pressure flange.

Welds 208 and 210 can be clearly seen in FIG. 3 coupling each of connection rings 204, 206 to weld rings 205, 207, respectively. Weld rings 205, 207 are preferably laser-welded to pressure sensor module 200 to secure the isolator diaphragms to the sensor module. Down-turned lips 212, 214 are coupled to inner diameters 216 via respective welds 222, 224. The combination of fusion welds 208, 210, 222 and 224 allows each of connections rings 204, 206 to physically bond and seal pressure sensor module 200 to bi-planar pressure flange 202. As can be appreciated, in order to generate fusion welds 222 and 224, it is necessary to access those areas with the welding equipment. Accordingly, weld caps 218 and 220 are some of the last components to be assembled thereby allowing the weld equipment to pass through the apertures that are otherwise blocked by weld caps 218 and 220. Once fusion welds 222 and 224 are complete, weld caps 218 and 220 can be set in place and welded with a third set of fusion welds 226, 228, respectively. Then, plug 223 is fixed in place using fusion weld 230.

Figure 4:
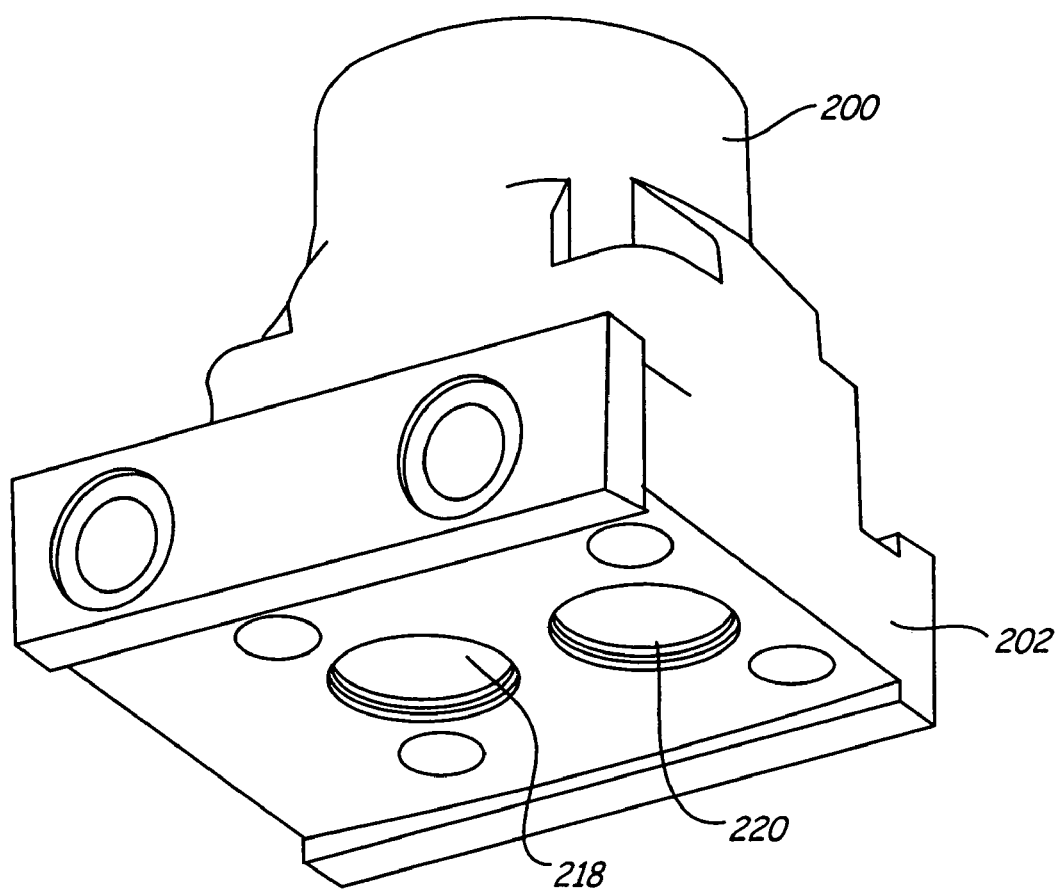
FIGS. 4 and 5 are perspective assembled and exploded views, respectively, illustrating embodiments of the present invention.
Figure 5:
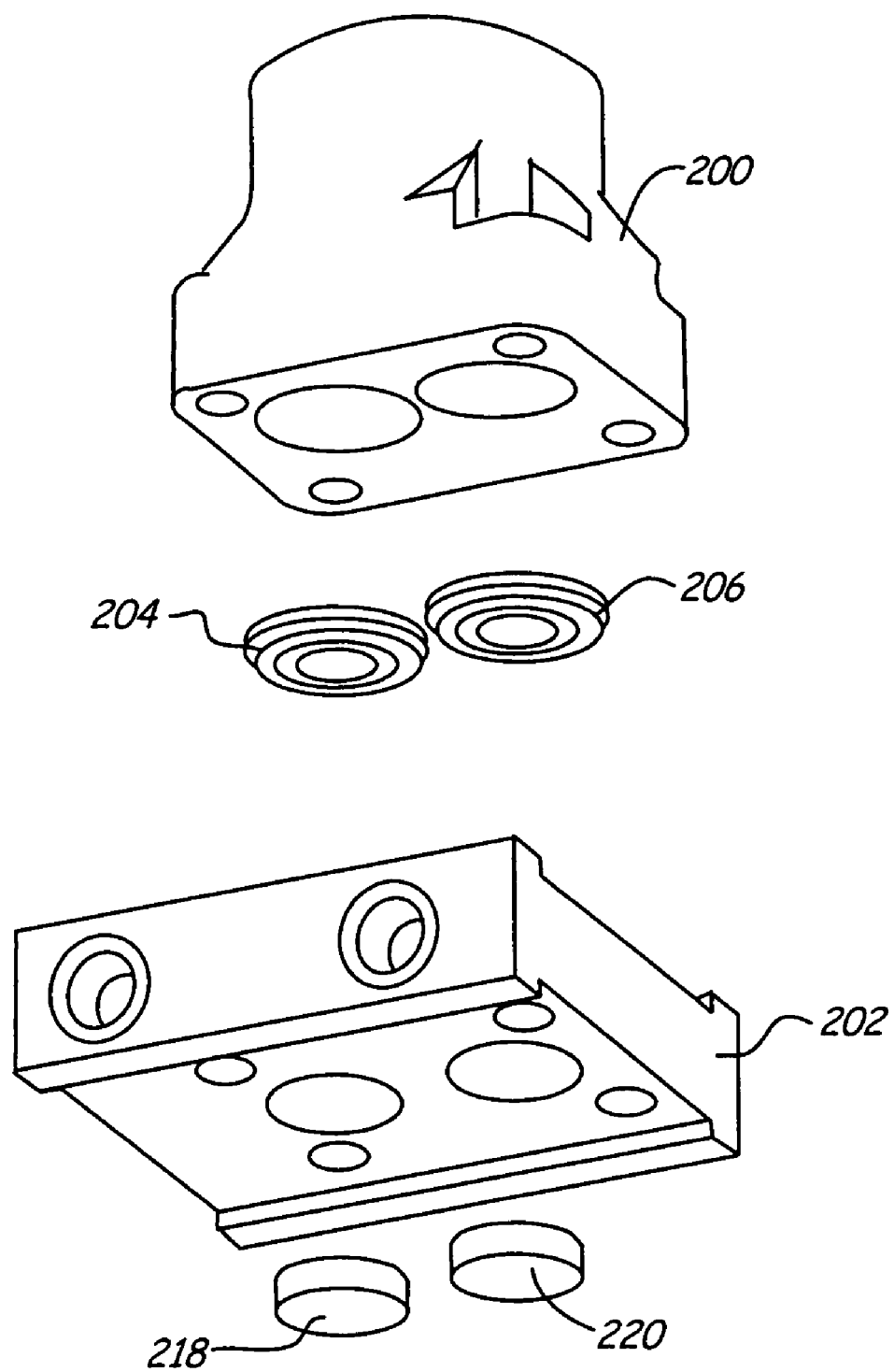

FIGS. 4 and 5 are perspective assembled and exploded views, respectively, illustrating embodiments of the present invention.

FIG. 4 is a bottom perspective view of co-planar pressure sensor assembly 200 coupled to pressure module 202 with weld caps 218 and 220 welded onto pressure module 202.

FIG. 5 is an exploded perspective view illustrating, individually, pressure sensor module 200, connection ring 204, connection ring 206, pressure flange 202, and weld caps 218 and 220.

Figure 6:
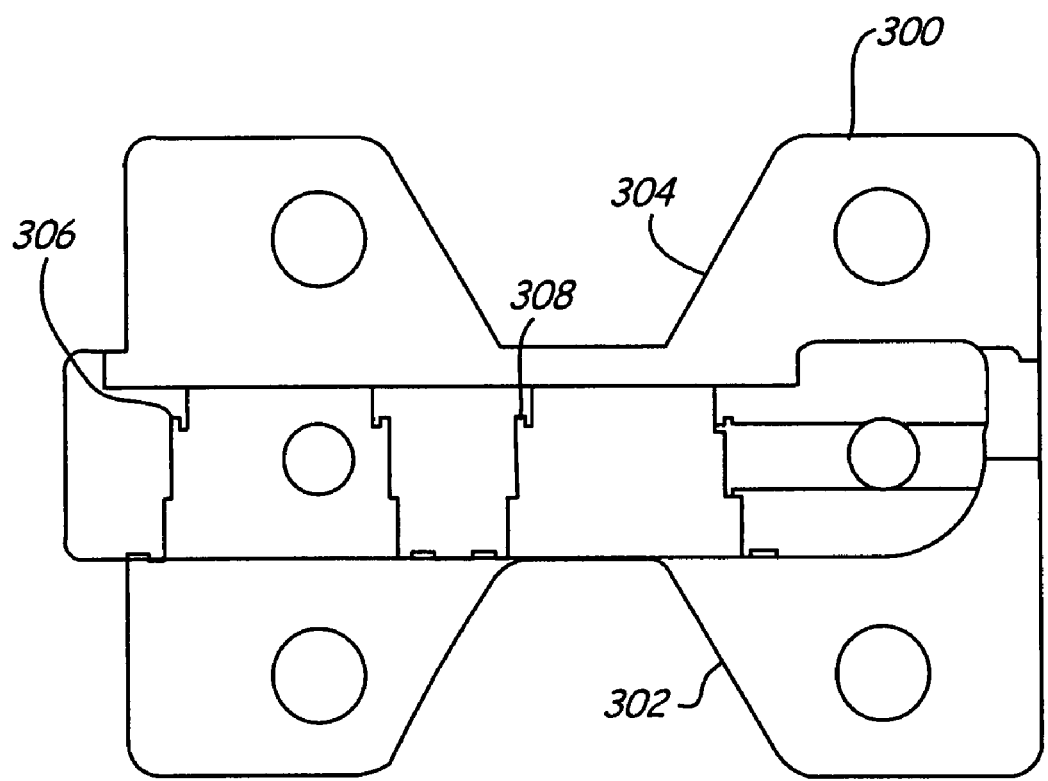
FIG. 6 is a side elevation cross-sectional view illustrating a portion of a bi-planar pressure flange in accordance with an embodiment of the present in invention.

FIG. 6 is a side elevation cross-sectional view illustrating a portion of a bi-planar pressure flange in accordance with an embodiment of the present invention. FIG. 6 is relatively similar to the embodiment illustrated in FIG. 3 with the exception that pressure flange 300 employs a pair of cutaway regions 302 and 304 to facilitate mounting of the transmitter. Additionally, pressure flange 300 also includes a pair of small annular recesses 306, 308 that facilitate attachment of the connection rings.

While weld caps 218 and 220 have been shown and described as circular, any suitable shape can be used. For example, one or both of weld caps 218, 220 can be elongated, such as of an elliptical shape, or rectangular.

Figure 7:
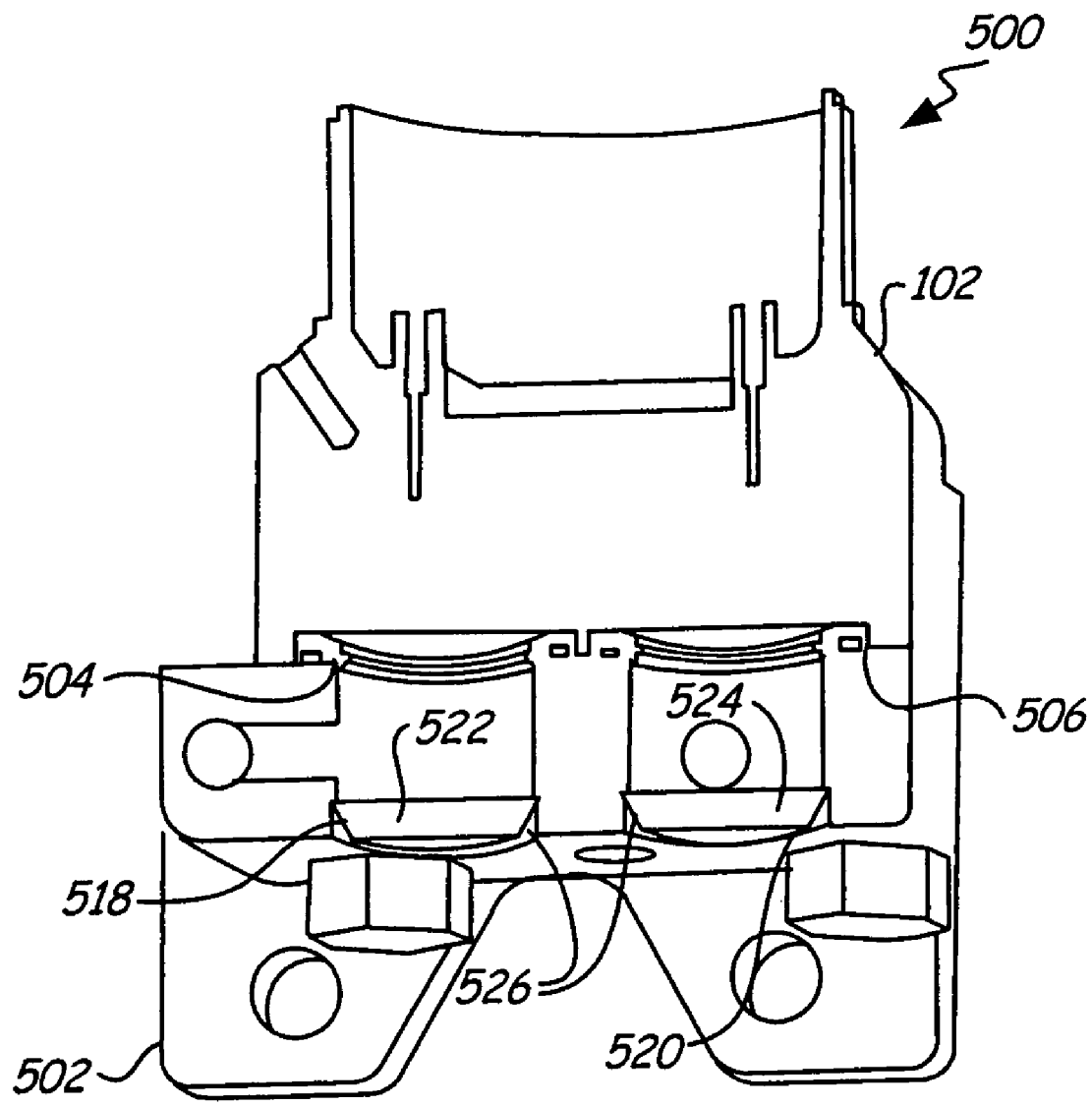
FIG. 7 is a cross sectional view of a co-planar pressure sensor module coupled to a bi-planar pressure flange in accordance with another embodiment of the present invention.

FIG. 7 is a cross-sectional view of a co-planar pressure sensor module coupled to a bi-planar pressure flange in accordance with another embodiment of the present invention. As illustrated, assembly 500 can utilize any suitable co-planar pressure sensor module, such as module 102 described above. Module 102 is coupled to bi-planar pressure flange 502 via specialized weld rings 504, 506. Each of weld rings 504, 506 is preferably laser-welded to co-planar pressure sensor module 102 in a manner similar to that of the prior art. Alternatively, any suitable type of welding can be used to couple each of rings 504, 506 to pressure sensor module 102. As illustrated in FIG. 7, and shown in greater detail in FIG. 8, each of rings 504, 506 includes a lateral surface 508, 510 that corresponds with lateral surface 512 of pressure flange 502. Each of rings 504 and 506 is fusion-welded to pressure flange 502 at welds 514, 516, respectively. Access for the weld equipment to provide welds 514 and 516 is provided through apertures 518 and 520 with weld caps 522 and 524 removed. Once welds 514 and 516 are completed, weld caps 522 and 524 are laid in place and fusion welds are provided in the triangular spaces indicated at reference numerals 526. FIG. 7 also illustrates that the pressure flange 502 does not include a lateral hole that requires plugging. Accordingly, only four fusion welds are required to completely mount and seal bi-planar pressure flange 502 to co-planar pressure sensor module 102.

In accordance with an embodiment of the present invention, the prior art mounting technique of utilizing four bolts to mount the pressure flange to the pressure sensor module is used in conjunction with the all-welded attachment system set forth above. Preferably, the bolts are stainless steel bolts that are torqued to approximately 300 inch-pounds. The utilization of flange bolts helps facilitate carrying of the load of the pressure transmitter in seismic and/or other vibration conditions. This provides an extremely robust coupling between the pressure sensor module and the pressure flange. Additionally, it is believed that pressure sensing systems (pressure sensor module coupled to a pressure flange) manufactured in accordance with embodiments of the present invention will achieve certifications for operating in more demanding operating conditions, for longer periods of time than products currently on the market.

Figure 9:
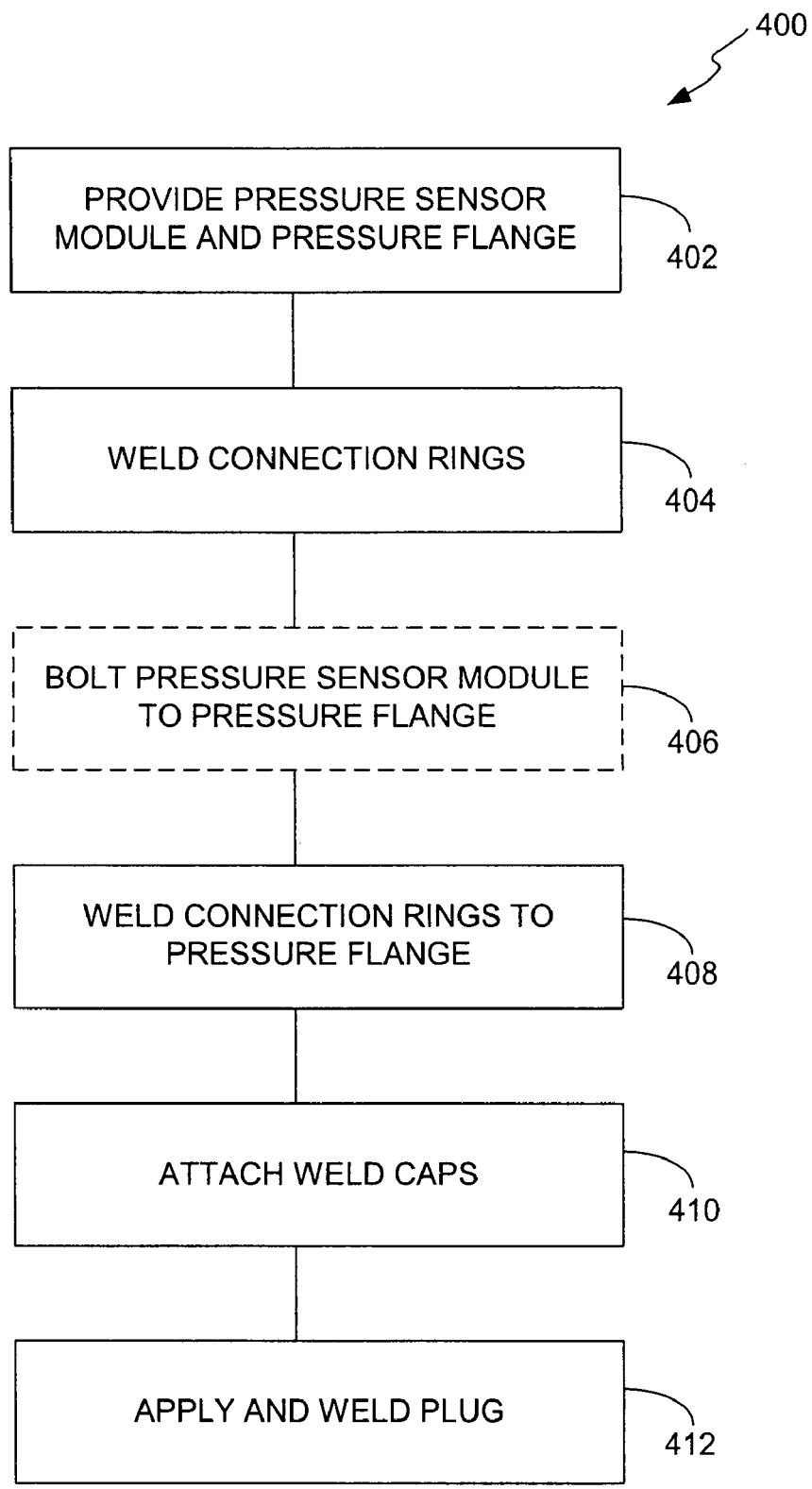
FIG. 9 is a block diagram of a method of manufacturing a pressure sensing system in accordance with an embodiment of the present invention.

FIG. 9 is a block diagram of a method of manufacturing a pressure sensing system in accordance with an embodiment of the present invention. Method 400 begins at block 402 where a co-planar pressure sensor module and bi-planar pressure flange are provided. Next, at block 404, a pair of connection rings are fusion welded to the pressure sensor module as described above. Next, optional block 406 is preferably performed where the pressure flange is bolted to the pressure sensor module preferably using stainless steel bolts which are torqued to approximately 300 inch-pounds. At block 408, the connection rings are welded to the pressure flange. As described above, access for the welding equipment is provided through a pair of apertures. At block 410, the apertures through which the welding equipment was previously provided to weld the connection rings to the pressure flange are filled with weld caps. The weld caps are then welded in place. Next, at block 412, if required, a plug is inserted and welded in place as described above. The order in which blocks 410 and 412 are performed does not matter for method 400. However, it is important that the connection rings be welded to the pressure sensor module before the connection rings are welded to the pressure flange. Accordingly, block 404 must be performed before block 408. Further, it is also important that the connection rings be welded to the pressure flange before the weld caps are attached. Accordingly, block 408 must be performed before block 410.

Figure 8:
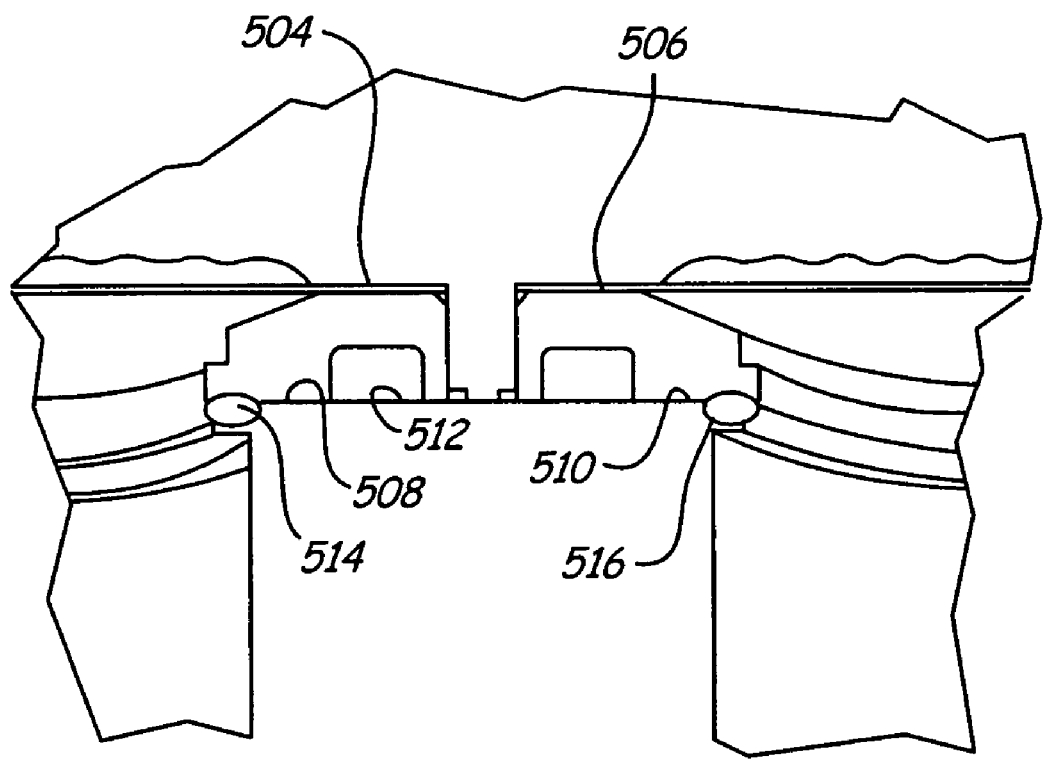
FIG. 8 is an enlarged diagrammatic view of a pressure sensor module coupled to a bi-planar pressure flange through a weld ring in accordance with an embodiment of the present invention.
Figure 10:
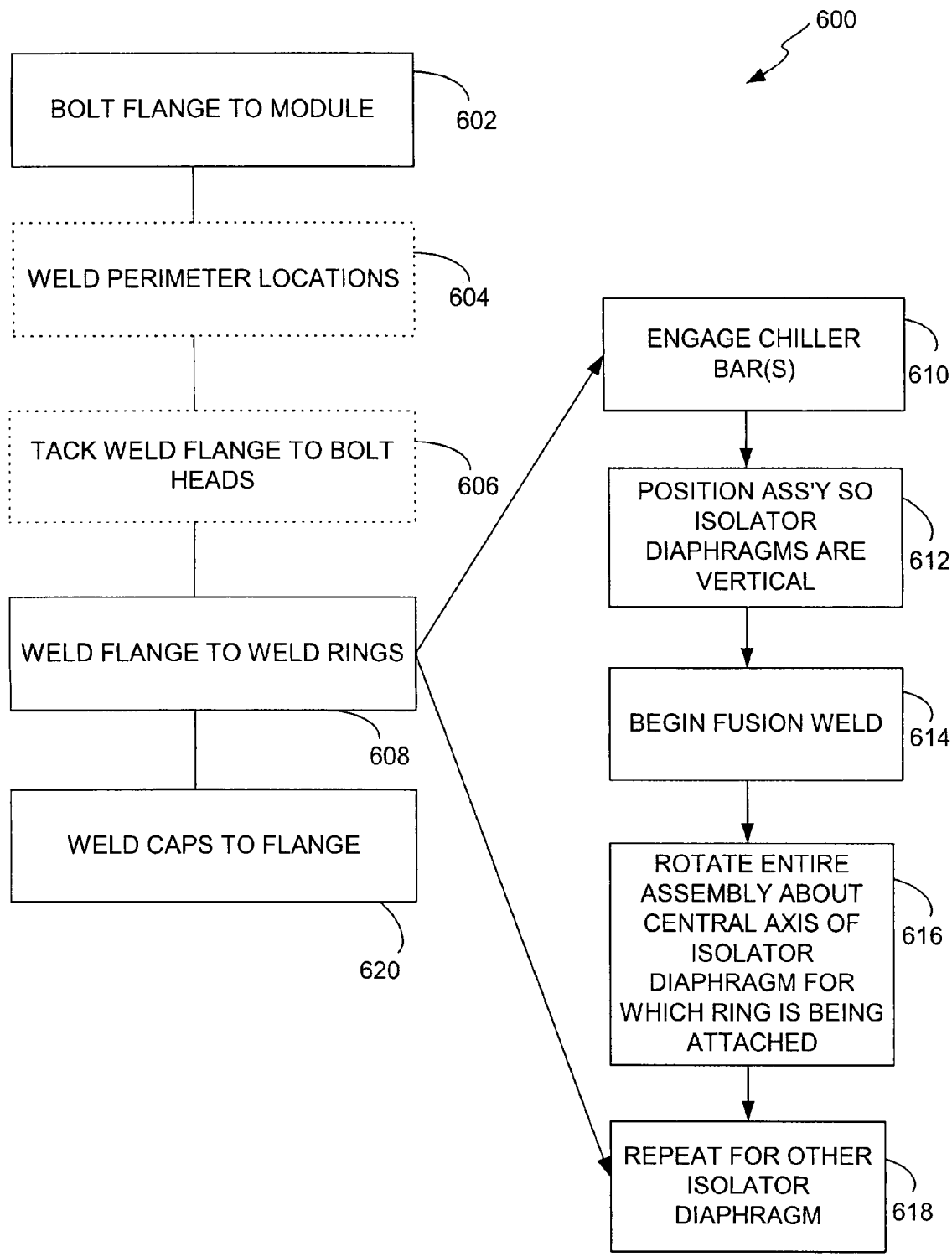
FIG. 10 is a block diagram of a method of manufacturing a pressure sensing system in accordance with an embodiment of the present invention.

FIG. 10 is a flow diagram of a method for assembling the co-planar pressure sensor module and pressure flange illustrated with respect to FIGS. 7 and 8. While the embodiment described with respect to FIGS. 7 and 8 provides a completely sealed and robust module with less fusion welds, it requires precise manufacturing. This is because the amount of heat on the weld ring must be controlled to small levels in order to ensure that the isolator diaphragms are not damaged. As illustrated in FIG. 10, method 600 begins at block 602 where the bi-planar flange is bolted to the co-planar pressure sensor module. This ensures that the co-planar pressure sensor module and the bi-planar flange are aligned prior to welding. At optional block 604, illustrated in phantom, the flange can be welded to two or more locations on the co-planar pressure sensor module about the perimeter. Additionally, at optional block 606, the heads of the bolts used to mount the flange to the pressure sensor module can be tack-welded to the flange. At block 608, weld rings 504 and 506 are welded to flange 502. It is important to note that prior to step 608, weld rings 504 and 506 are actually welded to the co-planar pressure sensor module 102 using any suitable type of weld, such as a laser weld or fusion weld. Block 608 is actually a relatively complex step and the various sub-steps are illustrated to the right of block 608. Specifically, for a first weld ring, one or more chiller bars are utilized as indicated at block 610. Once the chiller bars are in position, the entire co-planar pressure sensor module and bi-planar pressure flange assembly is positioned such that the isolator diaphragms are vertical with respect to gravity. In other words, the entire assembly is laid on its side, as indicated at block 612. Optionally, inserts may be laid on the isolators to protect them from heat and/or weld spatter. At block 614, the fusion weld between the weld ring and the flange is initiated. At block 616, the fusion weld process itself continues with the fusion weld equipment remaining stationary, and entire co-planar pressure sensor module/bi-planar pressure flange assembly rotating about the central axis of the isolator diaphragm proximate which the weld is being performed. Once the entire assembly has undergone one complete revolution and the fusion weld is complete, the entire sequence of steps 610 through 616 is repeated for the other weld rings/isolator diaphragm, as indicated at block 618. If required to reduce heat, cooling may be allowed between steps 614, 616 and/or 618 to dissipate heat from the assembly. Once the two weld rings have been welded, method 600 continues at block 620 where the two weld caps are fusion welded in place. If desired, temperature sensitive devices, such as thermocouples, can be employed to monitor, or otherwise measure, the temperature proximate the isolator diaphragms in order to ensure that excess heat is not being generated.

Although the present invention has been described with reference to preferred embodiments, workers skilled in the art will recognize that changes may be made in form and detail without departing from the spirit and scope of the invention.

What is claimed is:

1. A pressure measurement system comprising:
   a co-planar pressure sensor module having a pair of isolator diaphragms that are substantially co-planar with one another;
   a plurality of weld rings welded to the pressure sensor module, each weld ring being welded proximate and about a respective isolator diaphragm to secure the diaphragm to the sensor module;
   a plurality of connection rings, each connection ring being welded to a respective weld ring;
   a bi-planar pressure flange welded to each of the connection rings; and
   wherein fluidic coupling from a process fluid pressure inlet of the bi-planar flange to an isolator diaphragm of the co-planar pressure module occurs without encountering any compressive seals.

2. The system of claim 1, wherein the bi-planar flange includes a first plurality of apertures, each aperture having an inner diameter that is sized to receive a portion of a respective connection ring, and wherein each inner diameter of the bi-planar pressure flange is welded to the portion of its respective connection ring.

3. The system of claim 2, wherein the portion of the connection ring that the first set of apertures is sized to receive is formed as a down-turned lip.

4. The system of claim 2, wherein the bi-planar flange includes a second plurality of apertures sized to allow weld equipment access to the inner diameter of the first plurality of apertures.

5. The system of claim 4, and further comprising a plurality of weld caps, each weld cap being disposed within and fusion welded to a respective one of the second plurality of apertures.

6. The system of claim 5, wherein the weld caps are circular.

7. The system of claim 5, and further comprising a plug welded into a passageway of the bi-planar flange using a fusion weld.

8. The system of claim 1, wherein at least one of the fusion weld is a Tungsten-Inert-Gas (TIG) weld.

9. The system of claim 8, wherein all welds are TIG welds.

10. The system of claim 1, and further comprising a plurality of mounting bolts disposed to cause the bi-planar pressure flange to bear against the co-planar pressure sensor module.

11. A method of manufacturing a pressure measurement assembly, the method comprising:
- providing a co-planar pressure sensor module and a bi-planar pressure flange;
- welding a plurality of connection rings to the co-planar pressure sensor flange;
- bringing the bi-planar flange into contact with the co-planar pressure sensor module; and
- welding the bi-planar pressure flange to the connection rings.

12. The method of claim 11, wherein welding the bi-planar pressure flange to the connection rings is done through a plurality of access apertures in the bi-planar pressure flange.

13. The method of claim 12, and further comprising welding a weld cap into each of the plurality of access apertures.

14. The method of claim 11, wherein the welding is fusion welding.

15. The method of claim 14, wherein the fusion welding is TIG welding.

16. The method of claim 11, and wherein bringing the bi-planar flange into contact with the co-planar pressure sensor module includes bolting the flange to the module with a plurality of mounting bolts.

17. The method of claim 11, wherein the entire assembly is rotated about a central axis of an isolator diaphragm while the connection ring is being welded.

18. A pressure measurement system comprising:
- a co-planar pressure sensor module having a pair of isolator diaphragms that are substantially co-planar with one another;
- a plurality of weld rings welded to the pressure sensor module, each weld ring being welding proximate and about a respective isolator diaphragm to secure the diaphragm to the sensor module;
- a bi-planar pressure flange fusion welded to each of the weld rings; and
- wherein fluidic coupling from a process fluid pressure inlet of the bi-planar flange to an isolator diaphragm of the co-planar pressure module occurs without encountering any compressive seals.

19. The system of claim 18, wherein each of the weld rings is welded to the co-planar pressure sensor module with a laser weld.

20. The system of claim 18, and further comprising a plurality of weld caps, each weld cap being disposed within and welded to a respective one of the second plurality of apertures.

* * * * *